US009235509B1

(12) United States Patent
Kankani et al.

(10) Patent No.: US 9,235,509 B1
(45) Date of Patent: Jan. 12, 2016

(54) WRITE AMPLIFICATION REDUCTION BY DELAYING READ ACCESS TO DATA WRITTEN DURING GARBAGE COLLECTION

(71) Applicant: SanDisk Enterprise IP LLC, Milpitas, CA (US)

(72) Inventors: Navneeth Kankani, Fremont, CA (US); Charles See Yeung Kwong, Redwood City, CA (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 77 days.

(21) Appl. No.: 14/029,655

(22) Filed: Sep. 17, 2013

Related U.S. Application Data

(60) Provisional application No. 61/870,171, filed on Aug. 26, 2013.

(51) Int. Cl.
  G06F 12/00 (2006.01)
  G06F 12/02 (2006.01)
(52) U.S. Cl.
  CPC ........ *G06F 12/0253* (2013.01); *G06F 12/0246* (2013.01)
(58) Field of Classification Search
  CPC .... G06F 12/0269; G06F 3/0652; G06F 3/064
  See application file for complete search history.

(56) References Cited

U.S. PATENT DOCUMENTS

| 4,173,737 A | 11/1979 | Skerlos et al. |
| 4,888,750 A | 12/1989 | Kryder et al. |
| 4,916,652 A | 4/1990 | Schwarz et al. |
| 5,129,089 A | 7/1992 | Nielsen |
| 5,270,979 A | 12/1993 | Harari et al. |
| 5,329,491 A | 7/1994 | Brown et al. |
| 5,381,528 A | 1/1995 | Brunelle |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,636,342 A | 6/1997 | Jeffries |
| 5,657,332 A | 8/1997 | Auclair et al. |

(Continued)

FOREIGN PATENT DOCUMENTS

| EP | 1 299 800 | 4/2003 |
| EP | 1465203 A1 | 10/2004 |

(Continued)

OTHER PUBLICATIONS

Lee et al., "A Semi-Premptive Garbage Collector for Solid State Devices", Apr. 2011, IEEE, p. 12-21 found at "http://ieeexplore.ieee.org/stamp/stamp.jsp?tp=&arnumber=5762711".*

(Continued)

*Primary Examiner* — Matthew Bradley
*Assistant Examiner* — Arvind Talukdar
(74) *Attorney, Agent, or Firm* — Morgan, Lewis & Bockius LLP

(57) ABSTRACT

The various implementations described herein include systems, methods and/or devices used to enable write amplification reduction by delaying read access to data written during garbage collection. In one aspect, read access to a write unit to which data was written during garbage collection is delayed until a predefined subsequent operation has been completed.

15 Claims, 8 Drawing Sheets

(56) References Cited

U.S. PATENT DOCUMENTS

| | | |
|---|---|---|
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,936,884 A | 8/1999 | Hasbun et al. |
| 5,943,692 A | 8/1999 | Marberg et al. |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,295,592 B1 | 9/2001 | Jeddeloh |
| 6,311,263 B1 | 10/2001 | Barlow et al. |
| 6,408,394 B1 | 6/2002 | Vander Kamp et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,678,788 B1 | 1/2004 | O'Connell |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader et al. |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,162,678 B2 | 1/2007 | Saliba |
| 7,173,852 B2 | 2/2007 | Gorobets et al. |
| 7,184,446 B2 | 2/2007 | Rashid et al. |
| 7,275,170 B2 | 9/2007 | Suzuki |
| 7,328,377 B1 | 2/2008 | Lewis et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,312,349 B2 | 11/2012 | Reche et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,627,117 B2 | 1/2014 | Johnston |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,885,434 B2 | 11/2014 | Kumar |
| 8,898,373 B1 | 11/2014 | Kang et al. |
| 8,910,030 B2 | 12/2014 | Goel |
| 8,923,066 B1 | 12/2014 | Subramanian et al. |
| 9,128,690 B2 | 9/2015 | Lotzenburger et al. |
| 2001/0050824 A1 | 12/2001 | Buch |
| 2002/0024846 A1 | 2/2002 | Kawahara et al. |
| 2002/0036515 A1 | 3/2002 | Eldridge et al. |
| 2002/0083299 A1 | 6/2002 | Van Huben et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |

(56) References Cited

U.S. PATENT DOCUMENTS

| | | |
|---|---|---|
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0085671 A1 | 4/2006 | Majni et al. |
| 2006/0087893 A1 | 4/2006 | Nishihara et al. |
| 2006/0107181 A1 | 5/2006 | Dave et al. |
| 2006/0136570 A1 | 6/2006 | Pandya |
| 2006/0136681 A1 | 6/2006 | Jain et al. |
| 2006/0156177 A1 | 7/2006 | Kottapalli et al. |
| 2006/0195650 A1 | 8/2006 | Su et al. |
| 2006/0244049 A1 | 11/2006 | Yaoi et al. |
| 2006/0259528 A1 | 11/2006 | Dussud et al. |
| 2006/0291301 A1 | 12/2006 | Ziegelmayer |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0201274 A1 | 8/2007 | Yu et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwall et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0056005 A1 | 3/2008 | Aritome |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0249160 A1 | 10/2009 | Gao et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0199125 A1 | 8/2010 | Reche |
| 2010/0199138 A1 | 8/2010 | Rho |
| 2010/0202196 A1 | 8/2010 | Lee et al. |
| 2010/0208521 A1 | 8/2010 | Kim et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0332858 A1 | 12/2010 | Trantham et al. |
| 2011/0010514 A1 | 1/2011 | Benhase et al. |
| 2011/0051513 A1 | 3/2011 | Shen et al. |
| 2011/0066597 A1 | 3/2011 | Mashtizadeh et al. |
| 2011/0072302 A1 | 3/2011 | Sartore |
| 2011/0078407 A1 | 3/2011 | Lewis |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bal et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2012/0023144 A1 | 1/2012 | Rub |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |

(56) References Cited

U.S. PATENT DOCUMENTS

| | | | |
|---|---|---|---|
| 2012/0151124 A1* | 6/2012 | Baek et al. | 711/103 |
| 2012/0151253 A1 | 6/2012 | Horn | |
| 2012/0151294 A1 | 6/2012 | Yoo et al. | |
| 2012/0173797 A1 | 7/2012 | Shen | |
| 2012/0185750 A1 | 7/2012 | Hayami | |
| 2012/0195126 A1 | 8/2012 | Roohparvar | |
| 2012/0203951 A1 | 8/2012 | Wood et al. | |
| 2012/0216079 A1 | 8/2012 | Fai et al. | |
| 2012/0233391 A1 | 9/2012 | Frost et al. | |
| 2012/0236658 A1 | 9/2012 | Byom et al. | |
| 2012/0239858 A1 | 9/2012 | Melik-Martirosian | |
| 2012/0239976 A1 | 9/2012 | Cometti et al. | |
| 2012/0259863 A1 | 10/2012 | Bodwin et al. | |
| 2012/0275466 A1 | 11/2012 | Bhadra et al. | |
| 2012/0278564 A1 | 11/2012 | Goss et al. | |
| 2012/0284574 A1 | 11/2012 | Avila et al. | |
| 2012/0284587 A1 | 11/2012 | Yu et al. | |
| 2013/0007073 A1 | 1/2013 | Varma | |
| 2013/0007343 A1 | 1/2013 | Rub et al. | |
| 2013/0007543 A1 | 1/2013 | Goss et al. | |
| 2013/0024735 A1 | 1/2013 | Chung et al. | |
| 2013/0031438 A1 | 1/2013 | Hu et al. | |
| 2013/0036418 A1 | 2/2013 | Yadappanavar et al. | |
| 2013/0047045 A1 | 2/2013 | Hu et al. | |
| 2013/0073924 A1 | 3/2013 | D'Abreu et al. | |
| 2013/0079942 A1 | 3/2013 | Smola et al. | |
| 2013/0086131 A1 | 4/2013 | Hunt et al. | |
| 2013/0086132 A1 | 4/2013 | Hunt et al. | |
| 2013/0094288 A1 | 4/2013 | Patapoutian et al. | |
| 2013/0111279 A1 | 5/2013 | Jeon et al. | |
| 2013/0111298 A1 | 5/2013 | Seroff et al. | |
| 2013/0121084 A1 | 5/2013 | Jeon et al. | |
| 2013/0124888 A1 | 5/2013 | Tanaka et al. | |
| 2013/0128666 A1 | 5/2013 | Avila et al. | |
| 2013/0132652 A1 | 5/2013 | Wood et al. | |
| 2013/0176784 A1 | 7/2013 | Cometti et al. | |
| 2013/0179646 A1 | 7/2013 | Okubo et al. | |
| 2013/0191601 A1 | 7/2013 | Peterson et al. | |
| 2013/0194874 A1 | 8/2013 | Mu et al. | |
| 2013/0232289 A1 | 9/2013 | Zhong et al. | |
| 2013/0254507 A1 | 9/2013 | Islam et al. | |
| 2013/0258738 A1 | 10/2013 | Barkon et al. | |
| 2013/0265838 A1 | 10/2013 | Li | |
| 2013/0282955 A1 | 10/2013 | Parker et al. | |
| 2013/0290611 A1 | 10/2013 | Biederman et al. | |
| 2013/0301373 A1 | 11/2013 | Tam | |
| 2013/0304980 A1 | 11/2013 | Nachimuthu et al. | |
| 2013/0343131 A1 | 12/2013 | Wu et al. | |
| 2014/0013188 A1 | 1/2014 | Wu et al. | |
| 2014/0063905 A1 | 3/2014 | Ahn et al. | |
| 2014/0075133 A1 | 3/2014 | Li et al. | |
| 2014/0082261 A1 | 3/2014 | Cohen et al. | |
| 2014/0082456 A1 | 3/2014 | Li et al. | |
| 2014/0095775 A1 | 4/2014 | Talagala et al. | |
| 2014/0122818 A1 | 5/2014 | Hayasaka et al. | |
| 2014/0136883 A1 | 5/2014 | Cohen | |
| 2014/0136927 A1 | 5/2014 | Li et al. | |
| 2014/0143505 A1 | 5/2014 | Sim et al. | |
| 2014/0201596 A1 | 7/2014 | Baum et al. | |
| 2014/0223084 A1 | 8/2014 | Lee et al. | |
| 2014/0258755 A1 | 9/2014 | Stenfort | |
| 2014/0269090 A1 | 9/2014 | Flynn et al. | |
| 2014/0359381 A1 | 12/2014 | Takeuchi et al. | |
| 2015/0153799 A1 | 6/2015 | Lucas et al. | |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075292 | 6/2008 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

International Search Report and Written Opinion dated Jul. 25, 2014, received in International Patent Application No. PCT/US2014/029453, which corresponds to U.S. Appl. No. 13/963,444, 9 pages (Frayer).

International Search Report and Written Opinion dated Mar. 7, 2014, received in International Patent Application No. PCT/US2013/074772, which corresponds to U.S. Appl. No. 13/831,218, 10 pages (George).

International Search Report and Written Opinion dated Mar. 24, 2014, received in International Patent Application No. PCT/US2013/074777, which corresponds to U.S. Appl. No. 13/831,308, 10 pages (George).

International Search Report and Written Opinion dated Mar. 7, 2014, received in International Patent Application No. PCT/US2013/074779, which corresponds to U.S. Appl. No. 13/831,374, 8 pages (George).

Invitation to Pay Additional Fees dated Feb. 13, 2015, received in International Patent Application No. PCT/US2014/063940, which corresponds to U.S. Appl. No. 14/135,433, 6 pages (Deipapa).

International Search Report and Written Opinion dated Jan. 21, 2015, received in International Application No. PCT/US2014/059748, which corresponds to U.S. Appl. No. 14/137,511, 13 pages. (Dancho).

International Search Report and Written Opinion dated Feb. 18, 2015, received in International Application No. PCT/US2014/066921, which corresponds to U.S. Appl. No. 14/135,260, 13 pages. (Fitzpatrick).

Barr, Introduction to Watchdog Timers, Oct. 2001, 3 pgs.

Canim, Buffered Bloom ilters on Solid State Storage, ADMS*10, Singapore, Sep. 13-17, 2010, 8 pgs.

Kang, A Multi-Channel Architecture for High-Performance NAND Flash-Based Storage System, J. Syst. Archit., 53, 9, Sep. 2007, 15 pgs.

Kim, A Space-Efficient Flash Translation Layer for CompactFlash Systems, May 2002, 10 pgs.

Lu, A Forest-structured Bloom Filter with Flash Memory, MSST 2011, Denver, CO, May 23-27, 2011, article, 6 pgs.

Lu, A Forest-structured Bloom Filter with Flash Memory, MSST 2011, Denver, CO, May 23-27, 2011, presentation slides, 25 pgs.

McLean, Information Technology-AT Attachment with Packet Interface Extension, Aug. 19, 1998, 339 pgs.

Park, A High Performance Controller for NAND Flash-Based Solid State Disk (NSSD), Feb. 12-16, 2006, 4 pgs.

Pliant Technology, International Search Report / Written Opinion, PCT/US08/88133, Mar. 19, 2009, 7 pgs.

Pliant Technology, International Search Report / Written Opinion, PCT/US08/88136, Mar. 19, 2009, 7 pgs.

Pliant Technology, International Search Report / Written Opinion, PCT/US08/88146, Feb. 26, 2009, 10 pgs.

Pliant Technology, International Search Report / Written Opinion, PCT/US08/88154, Feb. 27, 2009, 8 pgs.

Pliant Technology, International Search Report / Written Opinion, PCT/US08/88164, Feb. 13, 2009, 6 pgs.

Pliant Technology, International Search Report / Written Opinion, PCT/US08/88206, Feb. 18, 2009, 8 pgs.

Pliant Technology, International Search Report / Written Opinion, PCT/US08/88217, Feb. 19, 2009, 7 pgs.

Pliant Technology, International Search Report / Written Opinion, PCT/US08/88229, Feb. 13, 2009, 7 pgs.

Pliant Technology, International Search Report / Written Opinion, PCT/US08/88232, Feb. 19, 2009, 8 pgs.

(56) References Cited

OTHER PUBLICATIONS

Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
Sandisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
Office Action dated Dec. 8, 2014, received in Chinese Patent Application No. 201180021660.2, which corresponds to U.S. Appl. No. 12/726,200, 7 pages. (Olbrich).
Office Action dated Jul. 31, 2015, received in Chinese Patent Application No. 201180021660.2, which corresponds to U.S. Appl. No. 12/726,200, 9 pages. (Olbrich).
Bayer, "Prefix B-Trees", ip.com Journal, ip.com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm. com/library/cyberdig.nsf/papers/40B2C45876D0D747852575E100620CE7/$File/rc24815.pdf, 13 pages.
Oracle, "Oracle9i: Database Concepts", Jul. 2001, http://docs.oracle.com/cd/A91202_01/901_doc/server.901/a88856.pdf, 49 pages.
International Search Report and Written Opinion dated Jun. 8, 2015, received in International Patent Application No. PCT/US2015/018252, which corresponds to U.S. Appl. No. 14/339,072, 9 pages. (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
International Search Report and Written Opinion dated Jul. 23, 2015, received in International Patent Application No. PCT/US2015/030850, which corresponds to U.S. Appl. No. 14/298,843, 12 pages. (Ellis).
Ashkenazi et al., "Platform independent overall security architecture in multi-processor system-on-chip integrated circuits for use in mobile phones and handheld devices," ScienceDirect, Computers and Electrical Engineering 33 (2007), 18 pages.
Office Action dated Feb. 17, 2015, received in Chinese Patent Application No. 201210334987.1, which corresponds to U.S. Appl. No. 12/082,207 9 pages. (Prins).
International Search Report and Written Opinion dated May 4, 2015, received in International Patent Application No. PCT/US2014/065987, which corresponds to U.S. Appl. No. 14/135,400, 12 pages (George).
International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages. (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
International Search Report and Written Opinion dated Sep. 14, 2015, received in International Patent Application No. PCT/US2015/036807, which corresponds to U.S. Appl. No. 14/311,152, 9 pages (Higgins).

* cited by examiner

800

802 During a garbage collection operation, while writing data to a first sequence of write units of a storage medium block, perform a coarse multi-bit write operation that partially programs each memory cell of a respective write unit with a plurality of bits, followed by a second multi-bit write operation that completes programming of each memory cell of the respective write unit with the plurality of bits

804 Perform a second coarse multi-bit write operation that partially programs each memory cell of another write unit, distinct from the respective write unit, after the coarse programming of the respective write unit and prior to the second multi-bit write operation that completes programming of each memory cell of the respective write unit

806 The storage medium comprises one or more flash memory devices

808 During a write operation, performed in response to a host command, while writing data to a second sequence of write units of the storage medium block, perform a lower page write operation that partially programs each memory cell of a respective write unit with a single, respective lower page bit, followed by an upper page write operation that completes programming of each memory cell of the respective write unit with a respective upper page bit

810 When erasing data in the second sequence of write units, perform a default erase operation

812 When erasing data in the first sequence of write units, perform a shallow erase operation having a shorter duration than the default erase operation

Figure 8

WRITE AMPLIFICATION REDUCTION BY DELAYING READ ACCESS TO DATA WRITTEN DURING GARBAGE COLLECTION

RELATED APPLICATIONS

This application claims the benefit of U.S. Provisional Patent Application No. 61/870,171, filed on Aug. 26, 2013, which is incorporated by reference herein.

TECHNICAL FIELD

The disclosed embodiments relate generally to memory systems, and in particular, to write amplification reduction, for example in flash memory devices.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. Non-volatile memory retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Garbage collection is a process of memory management that reclaims portions of memory that no longer contain valid data. Using flash memory as an example, data is written to flash memory in units called pages, which are made up of multiple memory cells. However, flash memory is erased in larger units called blocks, which are made up of multiple pages. If some pages of a first block contain invalid data, those pages cannot be overwritten until the whole block containing those pages is erased. The process of garbage collection reads and re-writes the pages with valid data from the first block into a second block and then erases the first block. After garbage collection, the second block contains pages with valid data and free pages that are available for new data to be written. Since flash memory can only be programmed and erased a limited number of times, it is important to utilize a garbage collection scheme that maximizes or improves the life of a flash-based storage system.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable write amplification reduction by delaying read access to data written during garbage collection. In one aspect, read access to a write unit to which data was written during garbage collection is delayed until a predefined subsequent operation has been completed.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 8 illustrates a flowchart representation of a method of writing data in a storage system, in accordance with some embodiments.

Figure 1:
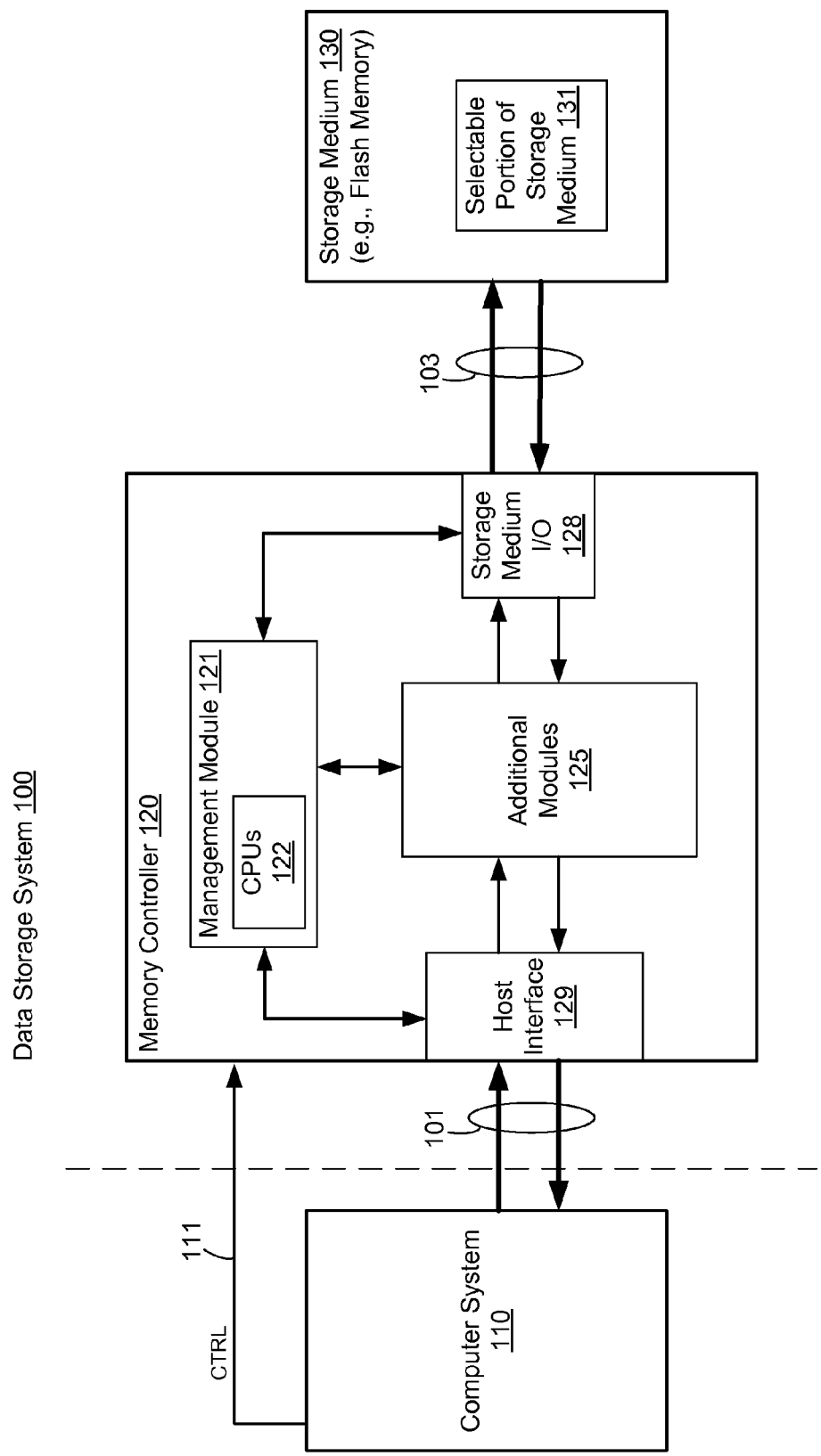
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable write amplification reduction by delaying read access to data written during garbage collection. Some implementations include systems, methods and/or devices to delay enabling read access to a write unit to which data was written during garbage collection until a predefined subsequent operation has been completed. Some implementations include systems, methods and/or devices to use lower page/upper page programming during write operations performed in response to a host command and to use coarse/fine programming during garbage collection.

More specifically, some implementations include a method of garbage collection in a storage system. In some implementations, the method includes during a garbage collection operation, while writing data to a sequence of write units of a storage medium block, delaying enabling read access to a respective write unit of the storage medium block, to which data was written during garbage collection, until a predefined subsequent operation on the storage medium block has been completed.

In some embodiments, the predefined subsequent operation on the storage medium block includes completion of writing data to at least N write units subsequent to writing data to the respective write unit.

In some embodiments, the predefined subsequent operation on the storage medium block includes completion of writing data to all remaining write units of the storage medium block subsequent to writing data to the respective write unit.

In some embodiments, the method further includes updating a translation table to point to the respective write unit after the predefined subsequent operation on the storage medium block has been completed.

In some embodiments, the sequence of write units is on a sequence of word lines.

In another aspect, a method of writing data in a storage system includes (1) during a garbage collection operation, while writing data to a first sequence of write units of a storage medium block, performing a coarse multi-bit write operation that partially programs each memory cell of a respective write unit with a plurality of bits, followed by a second (e.g., fine) multi-bit write operation that completes programming of each memory cell of the respective write unit with the plurality of bits, and (2) during a write operation, performed in response to a host command, while writing data to a second sequence of write units of the storage medium block, performing a lower page write operation that partially programs each memory cell of a respective write unit with a single, respective lower page bit, followed by an upper page write operation that completes programming of each memory cell of the respective write unit with a respective upper page bit.

In some embodiments, during the garbage collection operation, the method includes performing a second coarse multi-bit write operation that partially programs each memory cell of another write unit, distinct from the respective write unit, after the coarse programming of the respective write unit and prior to the second (e.g., fine) multi-bit write operation that completes programming of each memory cell of the respective write unit.

In some embodiments, the method further includes (1) when erasing data in the second sequence of write units, performing a default erase operation, and (2) when erasing data in the first sequence of write units, performing a shallow erase operation having a shorter duration than the default erase operation.

In some embodiments, the storage medium includes one or more non-volatile storage devices, such as flash memory devices.

In yet another aspect, any of the methods described above are performed by a device operable to perform garbage collection for a storage medium, the device including (1) a storage medium interface for coupling the device to the storage medium, and (2) one or more modules, including a memory management module that includes one or more processors and memory storing one or more programs configured for execution by the one or more processors, the one or more modules coupled to the storage medium interface and configured to perform any of the methods described above.

In yet another aspect, any of the methods described above are performed by a device operable to write data in a storage system, the device including (1) a storage medium interface for coupling the device to the storage medium, and (2) one or more modules, including a memory management module that includes one or more processors and memory storing one or more programs configured for execution by the one or more processors, the one or more modules coupled to the storage medium interface and configured to perform any of the methods described above.

In yet another aspect, a device is operable to perform garbage collection for a storage medium. In some embodiments, the device includes (1) a storage medium interface for coupling the device to the storage medium, and (2) means for, during a garbage collection operation, while writing data to a sequence of write units of a storage medium block, delaying enabling read access to a respective write unit of the storage medium block, to which data was written during garbage collection, until a predefined subsequent operation on the storage medium block has been completed.

In yet another aspect, a device is operable to write data in a storage system. In some embodiments, the device includes (1) a storage medium interface for coupling the device to the storage medium, (2) means for, during a garbage collection operation, while writing data to a first sequence of write units of a storage medium block, performing a coarse multi-bit write operation that partially programs each memory cell of a respective write unit with a plurality of bits, followed by a second (e.g., fine) multi-bit write operation that completes programming of each memory cell of the respective write unit with the plurality of bits, and (3) means for, during a write operation, performed in response to a host command, while writing data to a second sequence of write units of the storage medium block, performing a lower page write operation that partially programs each memory cell of a respective write unit with a single, respective lower page bit, followed by an upper page write operation that completes programming of each memory cell of the respective write unit with a respective upper page bit.

In yet another aspect, any of the methods described above are performed by a storage system comprising (1) a storage medium (e.g., comprising one or more non-volatile storage devices, such as flash memory devices) (2) one or more processors, and (3) memory storing one or more programs, which when executed by the one or more processors cause the storage system to perform or control performance of any of the methods described above.

In yet another aspect, a non-transitory computer readable storage medium stores one or more programs configured for execution by a device coupled to a storage medium, the one or more programs comprising instructions for causing the device and/or storage medium to perform any of the methods described above.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a diagram of an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, the data storage system 100 includes a memory controller 120, and a storage medium 130, and is used in conjunction with a computer system 110. In some implementations, storage medium 130 is a single flash memory device while in other implementations storage medium 130 includes a plurality of flash memory devices. In some implementations, storage medium 130 is NAND-type flash memory or NOR-type flash memory. Further, in some implementations memory controller 120 is a solid-state drive (SSD) controller. However, other types of storage media may be included in accordance with aspects of a wide variety of implementations.

Computer system 110 is coupled to memory controller 120 through data connections 101. However, in some implementations computer system 110 includes memory controller 120 as a component and/or a sub-system. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host or host system. In some implementations, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to memory controller 120 through connections 103. Connections 103 are sometimes called data connections, but typically convey commands in addition to data, and optionally convey metadata, error correction information and/or other information in addition to data values to be stored in storage medium 130 and data values read from storage medium 130. In some implementations, however, memory controller 120 and storage medium 130 are included in the same device as components thereof. Furthermore, in some implementations memory controller 120 and storage medium 130 are embedded in a host device, such as a mobile device, tablet, other computer or computer controlled device, and the methods described herein are performed by the embedded memory controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers.

Storage medium 130 is divided into a number of addressable and individually selectable blocks, such as selectable portion 131. In some implementations, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some implementations (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises any number of pages, for example, 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 130.

In some implementations, memory controller 120 includes a management module 121, a host interface 129, a storage medium interface (I/O) 128, and additional module(s) 125. Memory controller 120 may include various additional features that have not been illustrated for the sake of brevity and so as not to obscure more pertinent features of the example implementations disclosed herein, and a different arrangement of features may be possible. Host interface 129 provides an interface to computer system 110 through data connections 101. Similarly, storage medium I/O 128 provides an interface to storage medium 130 though connections 103. In some implementations, storage medium I/O 128 includes read and write circuitry, including circuitry capable of providing reading signals to storage medium 130 (e.g., reading threshold voltages for NAND-type flash memory).

In some implementations, management module 121 includes one or more processing units (CPUs, also sometimes called processors) 122 configured to execute instructions in one or more programs (e.g., in management module 121). In some implementations, the one or more CPUs 122 are shared by one or more components within, and in some cases, beyond the function of memory controller 120. Management module 121 is coupled to host interface 129, additional module(s) 125 and storage medium I/O 128 in order to coordinate the operation of these components.

Additional module(s) 125 are coupled to storage medium I/O 128, host interface 129, and management module 121. As an example, additional module(s) 125 may include an error control module to limit the number of uncorrectable errors inadvertently introduced into data during writes to memory or reads from memory. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions).

During a write operation, host interface 129 receives data to be stored in storage medium 130 from computer system 110. The data held in host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands on control line 111 to memory controller 120 requesting data from storage medium 130. Memory controller 120 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some implementations, if the decoding is not successful, memory controller 120 may resort to a number of remedial actions or provide an indication of an irresolvable error condition.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some implementations, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some implementations, when a flash memory cell's transistor conducts current at a given reading threshold voltage, indicating that the cell voltage is less than the reading threshold voltage, the raw data value for that read operation is a "1," and otherwise the raw data value is a "0."

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells, as described below). In some embodiments, programming is performed on an entire page.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages with valid data in that block are read and re-written to a new block and the old block is erased (or put on a queue for erasing). This process is called garbage collection. After garbage collection, the new block contains pages with valid data and free pages that are available for new data to be written, and the old block that was erased is also available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., storage medium 130) is a multiple of the logical amount of data intended to be written by a host (e.g., computer system 110, sometimes called a host). As discussed above, when a storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation (1):

$$\frac{\text{amount of data written to a storage medium}}{\text{amount of data written by a host}} \quad (1)$$

With the scaling of process nodes to sub-nanometer levels, endurance of storage mediums (e.g., NAND flash memories) is declining. Endurance degradation may result from drifting of cell voltages due to program disturb (e.g., during write operations), over programming, read disturb (e.g., during read operations), and retention effects. In order to maintain the reliability of the storage medium and avoid data loss, storage systems typically utilize background activities such as read disturb counters and/or read patrol mechanisms that check for counts of read and/or error thresholds to re-locate data before it is ECC uncorrectable. Read disturb is becoming increasingly difficult to manage, especially toward the end of life of a storage medium as data needs to be refreshed too often to maintain its reliability.

Further, operating at higher temperatures may cause retention charge loss on blocks that are cold (e.g., idle for an extended period of time from the last program command). Read patrolling is utilized to manage this operation retention issue. These background monitoring activities (e.g., read disturb counters and read patrolling) may result in a high refresh rate of data, which increases the write amplification, thus increasing endurance requirements (e.g., the number of write cycles a storage medium can withstand in its lifetime). For example, for a 5 drive write per day (DWPD) application with a warranty of 5 years, the endurance requirement is 18,250 with a write amplification of 2 and roughly 30,000 with a write amplification of 3.3. Further, increased background monitoring activities also degrade performance. As described below, more reliable writes during garbage collection help to reduce the background monitoring activities needed for reliability management, thus increasing performance.

One of the goals of any storage system architecture is to reduce write amplification as much as possible so that available endurance is used to meet storage medium reliability and warranty specifications. Higher system endurance also results in lower cost as the storage system may need less over-provisioning. By reducing the write amplification, the endurance of the storage medium is increased and the overall cost of the storage system is decreased. As described below, more reliable writes during garbage collection help to reduce the frequency of data refreshes due to retention charge loss or read disturb issues, resulting in write amplification reduction and extension of the lifetime of the storage system.

Figure 2:
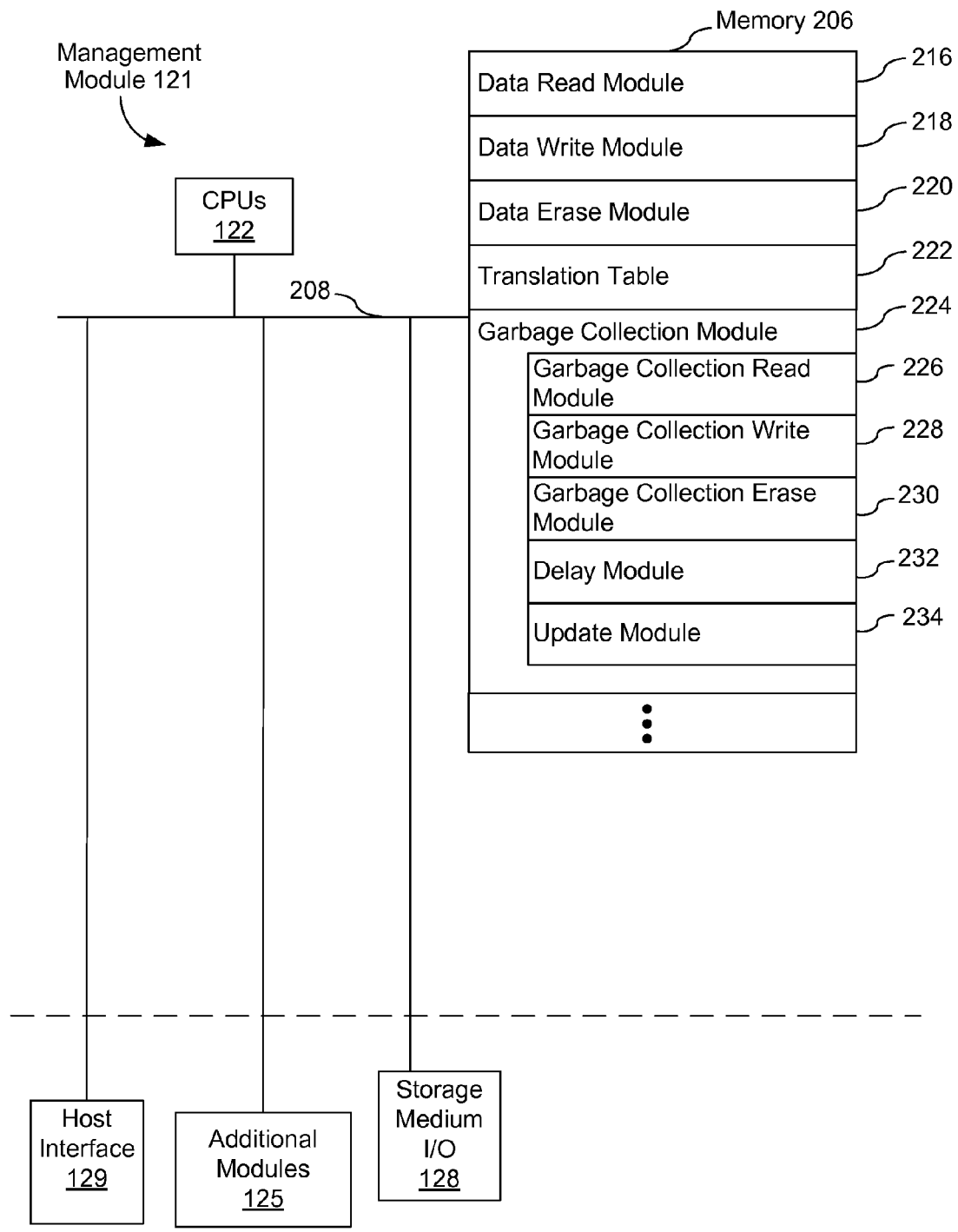
FIG. 2 is a block diagram illustrating an implementation of a management module, in accordance with some embodiments.

FIG. 2 is a block diagram illustrating an exemplary management module 121, in accordance with some embodiments. Management module 121 typically includes one or more processing units (CPUs) 122 for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. Management module 121 is coupled to host interface 129, additional module(s) 125, and storage medium I/O 128 by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

- a data read module 216 that is used for reading data from one or more blocks in a storage medium;
- a data write module 218 that is used for writing data to one or more blocks in a storage medium;
- a data erase module 220 that is used for erasing data from one or more blocks in a storage medium;
- a translation table 222 that is used for mapping logical addresses to physical addresses; and
- a garbage collection module 224 that is used for garbage collection for one or more blocks in a storage medium.

In some embodiments, the garbage collection module 224 optionally includes the following modules or sub-modules, or a subset thereof:

- a garbage collection read module 226 that is used for reading data from one or more blocks in a storage medium during a garbage collection operation;
- a garbage collection write module 228 that is used for writing data to one or more blocks in a storage medium during a garbage collection operation;
- a garbage collection erase module 230 that is used for erasing data from one or more blocks in a storage medium during a garbage collection operation;
- a delay module 232 that is used for delaying enabling read access to one or more write units of a storage medium block; and
- an update module 234 that is used for updating a translation table (e.g., translation table 222).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing any of the methods described below with reference to FIGS. 7-8.

Although FIG. 2 shows a management module 121, FIG. 2 is intended more as functional description of the various features which may be present in a management module than as a structural schematic of the embodiments described herein. In practice, and as recognized by those of ordinary skill in the art, items shown separately could be combined and some items could be separated.

As discussed below with reference to FIG. 3A, a single-level flash memory cell (SLC) stores one bit ("0" or "1"). Thus, the storage density of a SLC memory device is one bit of information per memory cell. A multi-level flash memory cell (MLC), however, can store two or more bits of information per cell by using different ranges within the total voltage range of the memory cell to represent a multi-bit bit-tuple. In turn, the storage density of a MLC memory device is multiple-bits per cell (e.g., two bits per memory cell).

Figure 3A:
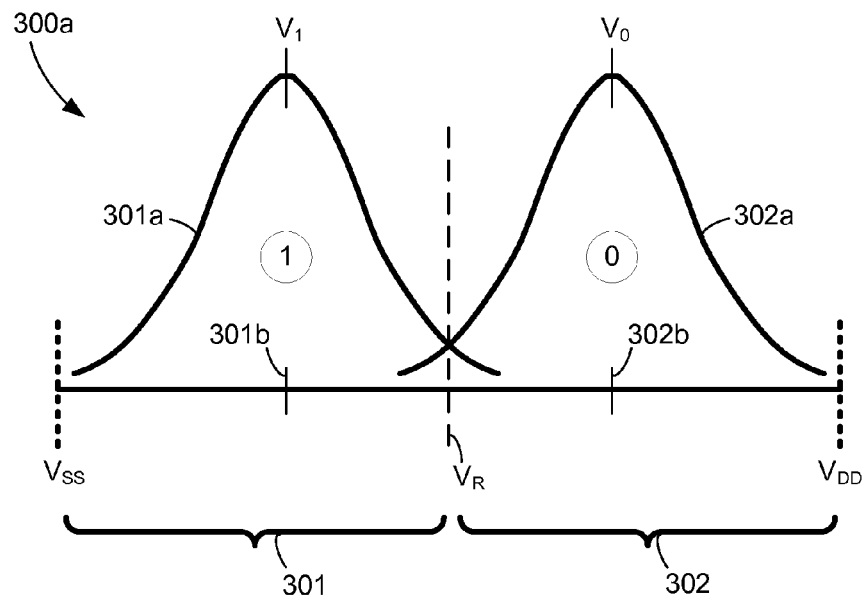
FIG. 3A is a prophetic diagram of voltage distributions that may be found in a single-level flash memory cell (SLC) over time, in accordance with some embodiments.

FIG. 3A is a simplified, prophetic diagram of voltage distributions 300*a* found in a single-level flash memory cell (SLC) over time, in accordance with some embodiments. The voltage distributions 300*a* shown in FIG. 3A have been simplified for illustrative purposes. In this example, the SLC's voltage range extends approximately from a voltage, $V_{SS}$, at a source terminal of an NMOS transistor to a voltage, $V_{DD}$, at a drain terminal of the NMOS transistor. As such, voltage distributions 300*a* extend between $V_{SS}$ and $V_{DD}$.

Sequential voltage ranges 301 and 302 between source voltage $V_{SS}$ and drain voltage $V_{DD}$ are used to represent corresponding bit values "1" and "0," respectively. Each voltage range 301, 302 has a respective center voltage $V_1$ 301*b*, $V_0$ 302*b*. As described below, in many circumstances the memory cell current sensed in response to an applied reading threshold voltages is indicative of a memory cell voltage different from the respective center voltage $V_1$ 301*b* or $V_0$ 302*b* corresponding to the respective bit value written into the memory cell. Errors in cell voltage, and/or the cell voltage sensed when reading the memory cell, can occur during write operations, read operations, or due to "drift" of the cell voltage between the time data is written to the memory cell and the time a read operation is performed to read the data stored in the memory cell. For ease of discussion, these effects are collectively described as "cell voltage drift." Each voltage range 301, 302 also has a respective voltage distribution 301*a*, 302*a* that may occur as a result of any number of a combination of error-inducing factors, examples of which are identified above.

In some implementations, a reading threshold voltage $V_R$ is applied between adjacent center voltages (e.g., applied proximate to the halfway region between adjacent center voltages $V_1$ 301*b* and $V_0$ 302*b*). Optionally, in some implementations, the reading threshold voltage is located between voltage ranges 301 and 302. In some implementations, reading threshold voltage $V_R$ is applied in the region proximate to where the voltage distributions 301*a* and 302*a* overlap, which is not necessarily proximate to the halfway region between adjacent center voltages $V_1$ 301*b* and $V_0$ 302*b*.

In order to increase storage density in flash memory, flash memory has developed from single-level (SLC) cell flash memory to multi-level cell (MLC) flash memory so that two or more bits can be stored by each memory cell. As discussed below with reference to FIG. 3B, a MLC flash memory device is used to store multiple bits by using voltage ranges within the total voltage range of the memory cell to represent different bit-tuples. A MLC flash memory device is typically more error-prone than a SLC flash memory device created using the same manufacturing process because the effective voltage difference between the voltages used to store different data values is smaller for a MLC flash memory device. Moreover, due to any number of a combination of factors, such as electrical fluctuations, defects in the storage medium, operating conditions, device history, and/or write-read circuitry, a typical error includes a stored voltage level in a particular MLC being in a voltage range that is adjacent to the voltage range that would otherwise be representative of the correct storage of a particular bit-tuple. As discussed in greater detail below with reference to FIG. 3B, the impact of such errors can be reduced by gray-coding the data, such that adjacent voltage ranges represent single-bit changes between bit-tuples.

Figure 3B:
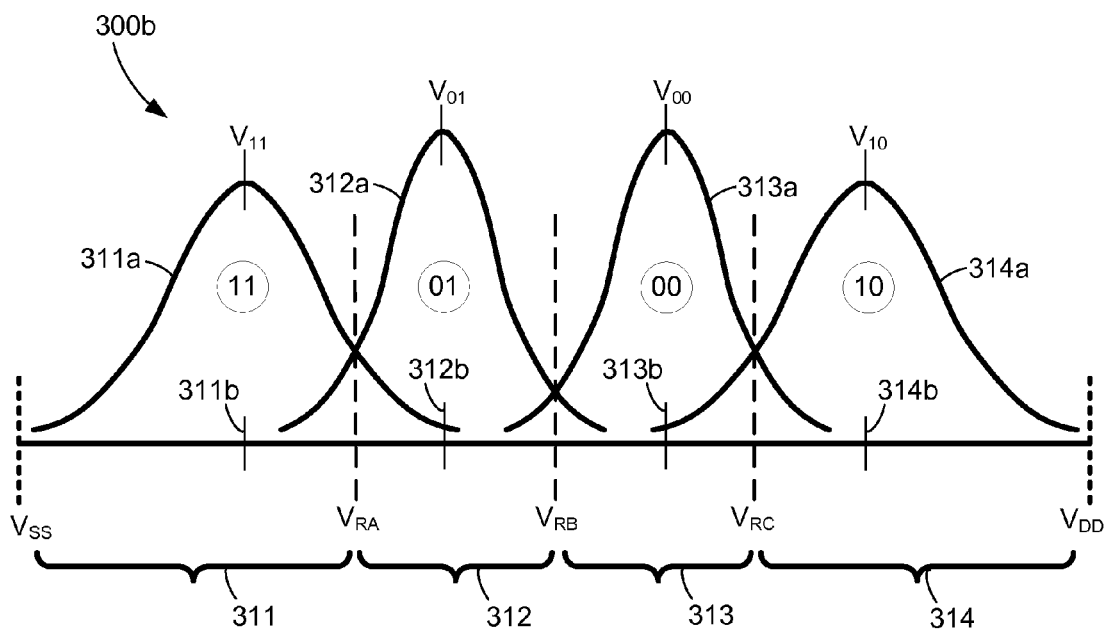
FIG. 3B is a prophetic diagram of voltage distributions that may be found in a multi-level flash memory cell (MLC) over time, in accordance with some embodiments.

FIG. 3B is a simplified, prophetic diagram of voltage distributions 300b found in a multi-level flash memory cell (MLC) over time, in accordance with some embodiments. The voltage distributions 300b shown in FIG. 3B have been simplified for illustrative purposes. The cell voltage of a MLC approximately extends from a voltage, $V_{SS}$, at the source terminal of a NMOS transistor to a voltage, $V_{DD}$, at the drain terminal. As such, voltage distributions 300b extend between $V_{SS}$ and $V_{DD}$.

Sequential voltage ranges 311, 312, 313, 314 between the source voltage $V_{SS}$ and drain voltages $V_{DD}$ are used to represent corresponding bit-tuples "11," "01," "00," "10," respectively. Each voltage range 311, 312, 313, 314 has a respective center voltage 311b, 312b, 313b, 314b. Each voltage range 311, 312, 313, 314 also has a respective voltage distribution 311a, 312a, 313a, 314a that may occur as a result of any number of a combination of factors, such as electrical fluctuations, defects in the storage medium, operating conditions, device history (e.g., number of program-erase (PE) cycles), and/or imperfect performance or design of write-read circuitry.

Ideally, during a write operation, the charge on the floating gate of the MLC would be set such that the resultant cell voltage is at the center of one of the ranges 311, 312, 313, 314 in order to write the corresponding bit-tuple to the MLC. Specifically, the resultant cell voltage would be set to one of $V_{11}$ 311b, $V_{01}$ 312b, $V_{00}$ 313b and $V_{10}$ 314b in order to write a corresponding one of the bit-tuples "11," "01," "00" and "10." In reality, due to the factors mentioned above, the initial cell voltage may differ from the center voltage for the data written to the MLC.

Reading threshold voltages $V_{RA}$, $V_{RB}$ and $V_{RC}$ are positioned between adjacent center voltages (e.g., positioned at or near the halfway point between adjacent center voltages) and, thus, define threshold voltages between the voltage ranges 311, 312, 313, 314. During a read operation, one of the reading threshold voltages $V_{RA}$, $V_{RB}$ and $V_{RC}$ is applied to determine the cell voltage using a comparison process. However, due to the various factors discussed above, the actual cell voltage, and/or the cell voltage received when reading the MLC, may be different from the respective center voltage $V_{11}$ 311b, $V_{01}$ 312b, $V_{00}$ 313b or $V_{10}$ 314b corresponding to the data value written into the cell. For example, the actual cell voltage may be in an altogether different voltage range, strongly indicating that the MLC is storing a different bit-tuple than was written to the MLC. More commonly, the actual cell voltage may be close to one of the read comparison voltages, making it difficult to determine with certainty which of two adjacent bit-tuples is stored by the MLC.

Errors in cell voltage, and/or the cell voltage received when reading the MLC, can occur during write operations, read operations, or due to "drift" of the cell voltage between the time data is written to the MLC and the time a read operation is performed to read the data stored in the MLC. For ease of discussion, sometimes errors in cell voltage, and/or the cell voltage received when reading the MLC, are collectively called "cell voltage drift."

One way to reduce the impact of a cell voltage drifting from one voltage range to an adjacent voltage range is to gray-code the bit-tuples. Gray-coding the bit-tuples includes constraining the assignment of bit-tuples such that a respective bit-tuple of a particular voltage range is different from a respective bit-tuple of an adjacent voltage range by only one bit. For example, as shown in FIG. 3B, the corresponding bit-tuples for adjacent ranges 301 and 302 are respectively "11" and "01," the corresponding bit-tuples for adjacent ranges 302 and 303 are respectively "01" and "00," and the corresponding bit-tuples for adjacent ranges 303 and 304 are respectively "00" and "10." Using gray-coding, if the cell voltage drifts close to a read comparison voltage level, the error is typically limited to a single bit within the 2-bit bit-tuple.

The following describes an example in which q=2 (i.e., 2 bits per cell in a MLC flash memory). However, those skilled in the art will appreciate that the 2-bit implementation may be extended to other types of MLC flash memory that have more bits (q≥3) per memory cell.

With respect to MLC flash memory (e.g., storage media 130, FIG. 1), there are generally two types of read operations that may be performed on MLC flash. One is a single-page read, which includes reading the respective bits of a particular page from a number of q-page MLC flash memory cells. For example, for a 2-page flash memory, the two constituent pages are referred to as the lower page and the upper page, where the lower page bit is typically the least significant bit of the 2-bit bit-tuple, and the upper page is the most significant bit. For the single-page read scenario, one of the upper page and lower page bit from a number of MLC flash memory cells is read. Thus, a lower-page read delivers a sequence of respective lower-page bits from a number of 2-page MLC flash memory cells. The other type of read is a joint-page read, which generally includes reading the respective bits of two or more pages from a number of q-page MLC flash memory cells. So, for a 2-page (i.e., q=2) flash memory, a joint-page read delivers a sequence of respective 2-bit bit-tuples from a number of 2-page MLC flash memory cells.

Similarly, with respect to MLC flash memory, there are generally two types of write operations that may be performed on MLC flash. One is a single-page write, which includes programming the respective bits of a particular page from a number of q-page MLC flash memory cells. For example, for a 2-page flash memory, a lower-page write operation programs the lower page bits of the memory cells and an upper-page write operation programs the upper page bits of the memory cells. The other type of write is a joint-page write, which generally includes programming the respective bits of two or more pages for a number of q-page MLC flash memory cells. So, for a 2-page (i.e., q=2) flash memory, a joint-page write programs both the lower page and upper page bits. As discussed below with respect to FIGS. 4A-4B, in some embodiments, joint-page writes include a coarse multi-bit write operation and/or a second (e.g., fine) multi-bit write operation.

Using the example of a 2-page flash memory, in some embodiments, a coarse/fine programming scheme programs both the lower page and the upper page in a first (e.g., coarse) multi-bit write operation that partially programs each memory cell of a respective write unit, and then programs both the lower page and the upper page in a second (e.g., fine) multi-bit write operation that completes programming of each memory cell of the respective write unit. In some embodiments, FIG. 4A illustrates voltage distributions found in a memory cell after the first (e.g., coarse) multi-bit write operation, and FIG. 4B illustrates voltage distributions found in a memory cell after the second (e.g., fine) multi-bit write operation.

Figure 4A:
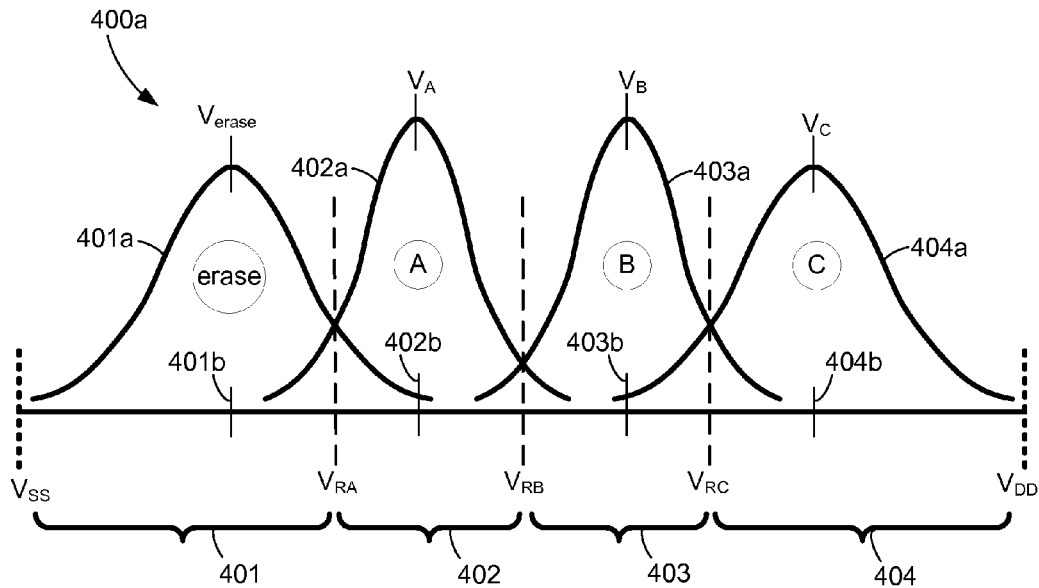
FIG. 4A is a prophetic diagram of voltage distributions that may be found in a multi-level flash memory cell (MLC) after a coarse multi-bit programming operation, in accordance with some embodiments.
Figure 4B:
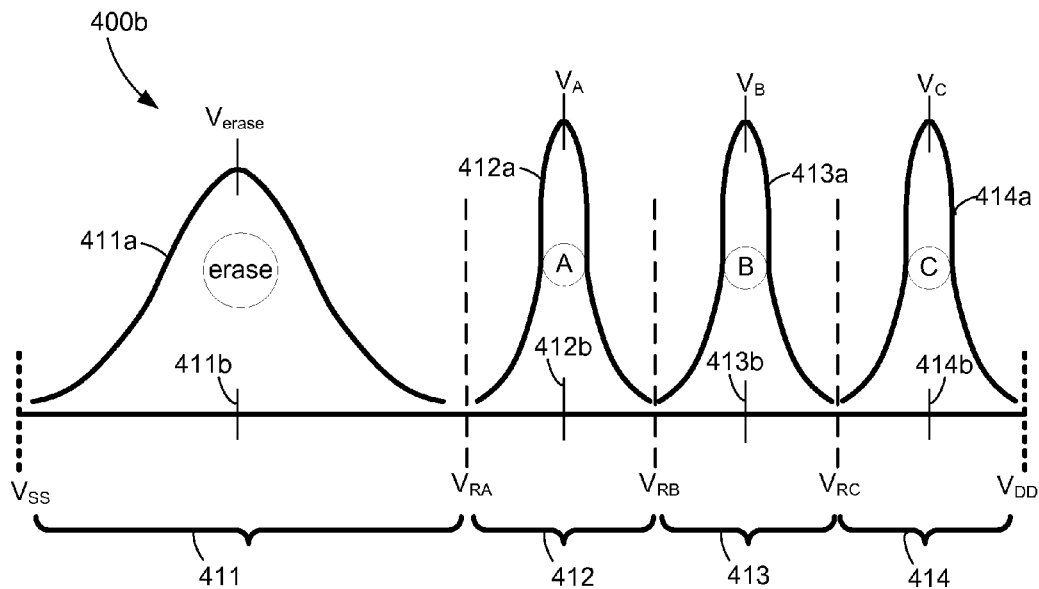
FIG. 4B is a prophetic diagram of voltage distributions that may be found in a multi-level flash memory cell (MLC) after a fine multi-bit programming operation, in accordance with some embodiments.

FIG. 4A is a prophetic diagram of voltage distributions 400a found in a multi-level flash memory cell (MLC) after a coarse multi-bit programming operation, in accordance with some embodiments. The voltage distributions 400a shown in FIG. 4A have been simplified for illustrative purposes. The cell voltage of a MLC approximately extends from a voltage, $V_{SS}$, at the source terminal of a NMOS transistor to a voltage, $V_{DD}$, at the drain terminal. As such, voltage distributions 400a extend between $V_{SS}$ and $V_{DD}$.

Sequential voltage ranges 401, 402, 403, 404 between the source voltage $V_{SS}$ and drain voltages $V_{DD}$ are used to represent corresponding values "erase," "A," "B," "C," respectively. Each voltage range 401, 402, 403, 404 has a respective center voltage 401b, 402b, 403b, 404b. Each voltage range 401, 402, 403, 404 also has a respective voltage distribution 401a, 402b, 403a, 404a that may occur as a result of any number of a combination of factors, such as electrical fluctuations, defects in the storage medium, operating conditions, device history (e.g., number of program-erase (PE) cycles), and/or imperfect performance or design of write-read circuitry.

Ideally, during a write operation, the charge on the floating gate of the MLC would be set such that the resultant cell voltage is at the center of one of the ranges 401, 402, 403, 404 in order to write the corresponding value to the MLC. Specifically, the resultant cell voltage would be set to one of $V_{erase}$ 401b, $V_A$ 402b, $V_B$ 403b and $V_C$ 404b in order to write a corresponding one of the values "erase," "A," "B," and "C." In reality, due to the factors mentioned above, the initial cell voltage may differ from the center voltage for the data written to the MLC.

Reading threshold voltages $V_{RA}$, $V_{RB}$ and $V_{RC}$ are positioned between adjacent center voltages (e.g., positioned at or near the halfway point between adjacent center voltages) and, thus, define threshold voltages between the voltage ranges 401, 402, 403, 404. During a read operation, one of the reading threshold voltages $V_{RA}$, $V_{RB}$ and $V_{RC}$ is applied to determine the cell voltage using a comparison process. However, due to the various factors discussed above, the actual cell voltage, and/or the cell voltage received when reading the MLC, may be different from the respective center voltage $V_{erase}$ 401b, $V_A$ 402b, $V_B$ 403b or $V_C$ 404b corresponding to the data value written into the cell. For example, the actual cell voltage may be in an altogether different voltage range, strongly indicating that the MLC is storing a different value than was written to the MLC. More commonly, the actual cell voltage may be close to one of the read comparison voltages, making it difficult to determine with certainty which of two adjacent values is stored by the MLC.

In some embodiments, the impact of a cell voltage drifting from one voltage range to an adjacent voltage range is reduced by further programming the bits (e.g., with a fine multi-bit programming operation) such that there is less overlap between voltage distributions 401a, 402b, 403a, 404a, as discussed below with respect to FIG. 4B.

FIG. 4B is a prophetic diagram of voltage distributions found in a multi-level flash memory cell (MLC) after a fine multi-bit programming operation, in accordance with some embodiments. Explanations provided above in connection with FIG. 4A, with respect to voltage distributions 400a, sequential voltage ranges 401, 402, 403, and 404, center voltages $V_{erase}$ 401b, $V_A$ 402b, $V_B$ 403b and $V_C$ 404b, voltage distributions 401a, 402b, 403a, and 404a, and reading threshold voltages $V_{RA}$, $V_{RB}$ and $V_{RC}$ are equally applicable to voltage distributions 400b, sequential voltage ranges 411, 412, 413, and 414, center voltages $V_{erase}$ 411b, $V_A$ 412b, $V_B$ 413b and $V_C$ 414b, voltage distributions 411a, 412a, 413a, and 414a, and reading threshold voltages $V_{RA}$, $V_{RB}$ and $V_{RC}$ as shown in FIG. 4B, except as described next.

After a fine multi-bit programming operation, as in FIG. 4B, the overlap between voltage distributions 411a, 412b, 413a, and 414a is less than the overlap between voltage distributions after a coarse multi-bit programming operation (e.g., voltage distributions 401a, 402b, 403a, and 404a, FIG. 4A). In some embodiments, the fine multi-bit programming operation occurs after a coarse multi-bit programming operation. The result of this coarse/fine programming scheme is much narrower voltage distributions and more margins between values "erase," "A," "B," and "C," which results, in turn, in reduced error rates, increased correction capability, and reduced usage of secondary error recovery or other techniques for recovering data that would otherwise have been lost. Further, data in the memory cell does not need to be refreshed as often, because the error rate is reduced, which results in reduced write amplification. The main drawback of a coarse/fine programming scheme is that the technique is not ideal for a write operation performed in response to a host command due to performance reasons. For example, coarse/fine programming takes longer than lower page/upper page programming for the same amount of data. This increases latency and impacts write performance. Thus, in some embodiments, a lower page/upper page programming scheme is used during write operations performed in response to a host command, as discussed below with respect to FIGS. 5A-5B. However, using a coarse/fine programming scheme during a garbage collection operation enables more reliable writes for the data that is re-written during garbage collection, thus reducing write amplification and extending the lifetime of the storage system.

Using the example of a 2-page flash memory, in some embodiments, a lower page/upper page programming scheme programs the lower page in a first (e.g., lower page) write operation that partially programs each memory cell of a respective write unit with a single, respective lower page bit, and then programs the upper page in a second (e.g., upper page) write operation that completes programming of each memory cell of the respective write unit with a respective upper page bit. In some embodiments, FIG. 5A illustrates voltage distributions found in a memory cell after the first (e.g., lower page) write operation, and FIG. 5B illustrates voltage distributions found in a memory cell after the second (e.g., upper page) write operation.

Figure 5A:
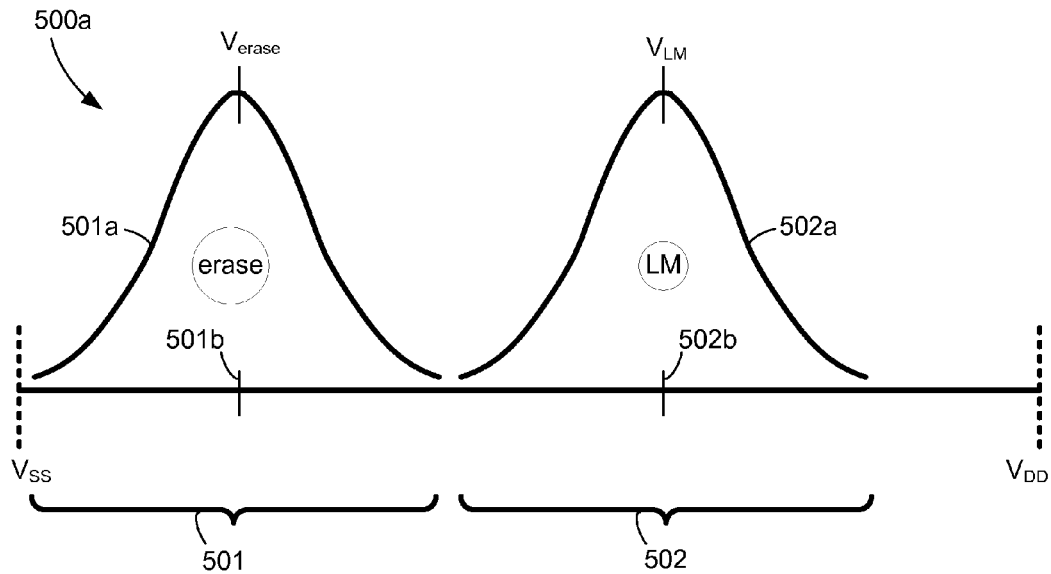
FIG. 5A is a prophetic diagram of voltage distributions that may be found in a multi-level flash memory cell (MLC) after a lower page programming operation, in accordance with some embodiments.
Figure 5B:
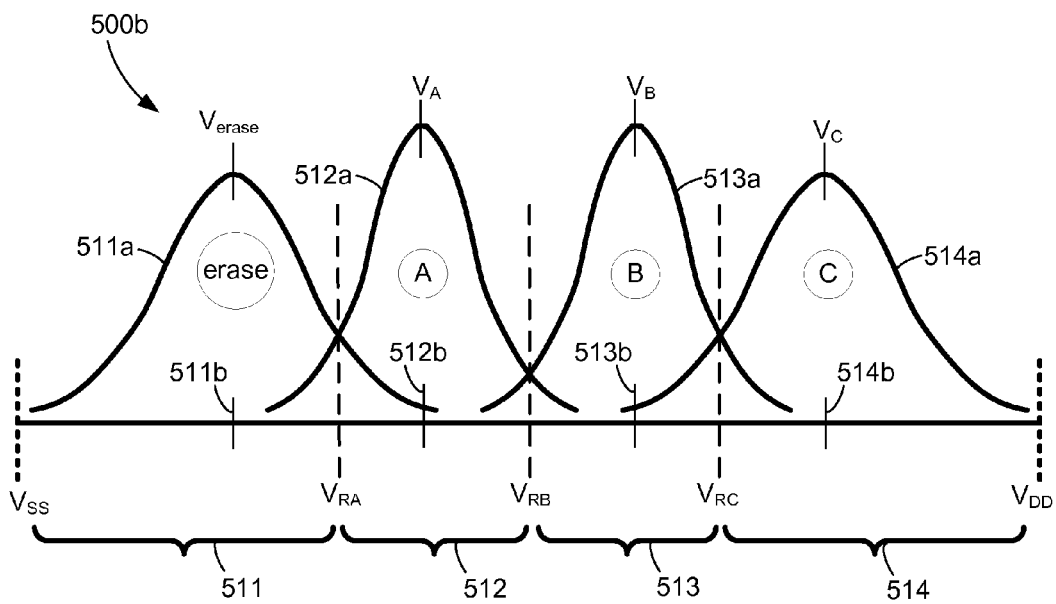
FIG. 5B is a prophetic diagram of voltage distributions that may be found in a multi-level flash memory cell (MLC) after an upper page programming operation, in accordance with some embodiments.

FIG. 5A is a prophetic diagram of voltage distributions found in a multi-level flash memory cell (MLC) after a lower page programming operation, in accordance with some embodiments. The voltage distributions 500a shown in FIG. 5A have been simplified for illustrative purposes. The cell voltage of a MLC approximately extends from a voltage, $V_{SS}$, at the source terminal of a NMOS transistor to a voltage, $V_{DD}$, at the drain terminal. As such, voltage distributions 500a extend between $V_{SS}$ and $V_{DD}$.

Sequential voltage ranges 501 and 502 between the source voltage $V_{SS}$ and drain voltages $V_{DD}$ are used to represent corresponding values "erase" and "LM" (e.g., lower page mode programming) respectively. Each voltage range 501 and 502 has a respective center voltage 501b and 502b. Each voltage range 501 and 502 also has a respective voltage distribution 501a and 502b that may occur as a result of any number of a combination of factors, such as electrical fluctuations, defects in the storage medium, operating conditions, device history (e.g., number of program-erase (PE) cycles), and/or imperfect performance or design of write-read circuitry.

Ideally, during a write operation, the charge on the floating gate of the MLC would be set such that the resultant cell voltage is at the center of one of the ranges 501 and 502 in order to write the corresponding value to the MLC. Specifically, the resultant cell voltage would be set to one of $V_{erase}$ 501b or $V_{LM}$ 502b in order to write a corresponding one of the values "erase" or "LM." In reality, due to the factors mentioned above, the initial cell voltage may differ from the center voltage for the data written to the MLC.

FIG. 5B is a prophetic diagram of voltage distributions found in a multi-level flash memory cell (MLC) after an upper page programming operation, in accordance with some embodiments. Explanations provided above in connection with FIG. 4A, with respect to voltage distributions 400a, sequential voltage ranges 401, 402, 403, and 404, center voltages $V_{erase}$ 401b, $V_A$ 402b, $V_B$ 403b and $V_C$ 404b, voltage distributions 401a, 402b, 403a, and 404a, and reading threshold voltages $V_{RA}$, $V_{RB}$ and $V_{RC}$ are equally applicable to voltage distributions 500b, sequential voltage ranges 511, 512, 513, and 514, center voltages $V_{erase}$ 511b, $V_A$ 512b, $V_B$ 513b and $V_C$ 514b, voltage distributions 511a, 512a, 513a, and 514a, and reading threshold voltages $V_{RA}$, $V_{RB}$ and $V_{RC}$ as shown in FIG. 5B, except as described next.

After a lower page programming operation programs the lower page bit, as discussed above with respect to FIG. 5A, an upper page programming operation programs the upper page bit. Thus, the two voltage distributions 501a and 502a (FIG. 5A) become four voltage distributions 511a, 512a, 513a, and 514a (FIG. 5B).

Figure 6:
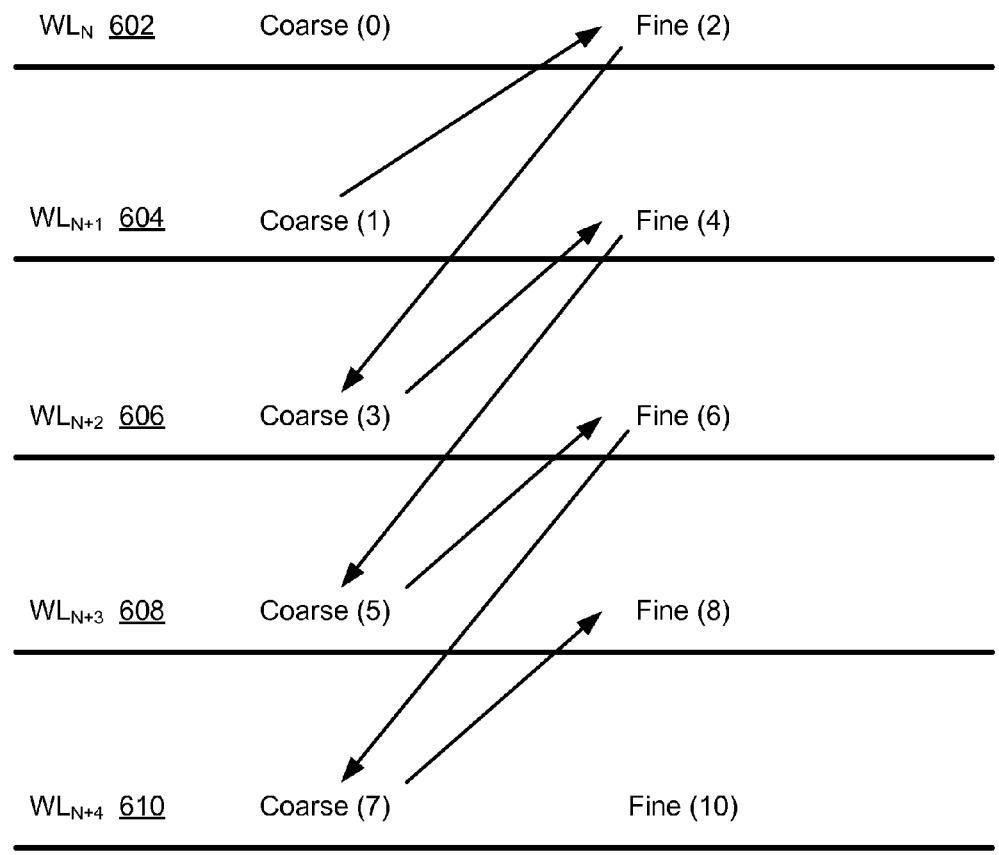
FIG. 6 illustrates a sequence of programming pages in a coarse/fine programming scheme, in accordance with some embodiments.

FIG. 6 illustrates a sequence 600 of programming pages in a coarse/fine programming scheme, in accordance with some embodiments. In some embodiments, FIG. 6 relates to the order of operations for writing to memory cells during a garbage collection operation, as discussed below with respect to operation 804. Typically, memory cells are written in a predefined sequence (e.g., first word line to last word line) and in general, a word line is not written to again until the block containing that word line is erased. Here, $WL_N$ (e.g., word line N) 602 is programmed by a coarse multi-bit programming operation (e.g., Coarse (0)). Then, $WL_{N+1}$ (e.g., word line N+1) 604 is programmed by a coarse multi-bit programming operation (e.g., Coarse (1)). Next, $WL_N$ 602 is programmed again, this time by a fine multi-bit programming operation (e.g., Fine (2)). The order of operations continues in this manner for the remaining word lines $WL_{N+2}$ 606, $WL_{N+3}$ 608, $WL_{N+4}$ 610, etc. In this example, each coarse programming operation, other than the coarse programming operation on the first word line, is followed by a fine programming operation on the word line prior to the word line on which the coarse programming operation was performed. In addition, each fine programming operation (e.g., on word line N), excluding the fine programming operations on the last two word lines of the set of word lines being programmed, is followed by a coarse programming operation on a word line (e.g., on word line N+2) positioned two word lines after the word line on which the fine programming operation was performed.

Technically, a translation table (e.g., translation table 222, FIG. 2) can be updated for a given word line upon successful completion of the coarse and fine programming on that word line. For example, the translation table can be updated for $WL_N$ 602 upon successful completion of Coarse (0) and Fine (2). However, in some embodiments, to allow for more reliable reads, a translation table is updated after two sequentially adjacent word lines have completed programming. For example, the translation table is updated for $WL_N$ 602 after $WL_{N+1}$ 604 and $WL_{N+2}$ 606 have completed programming (e.g., upon successful completion of Coarse (1), Fine (4), Coarse (3), and Fine (6). This reduces coupling effects and makes the read for $WL_N$ 602 more reliable. Optionally, in some embodiments, a translation table is updated after all remaining word lines in the block have completed programming.

Figure 7:
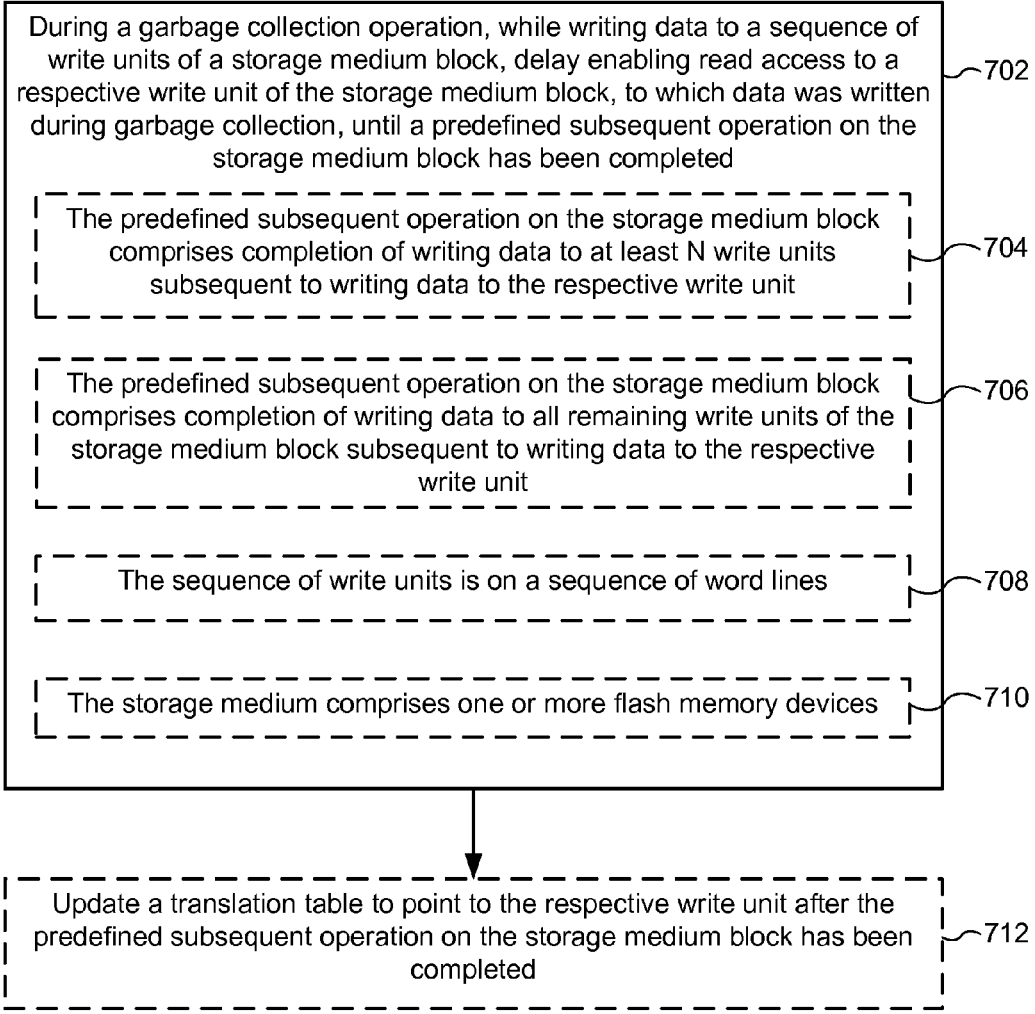
FIG. 7 illustrates a flowchart representation of a method of garbage collection in a storage system, in accordance with some embodiments.

FIG. 7 illustrates a flowchart representation of a method 700 of garbage collection in a storage system, in accordance with some embodiments. As noted above with respect to FIG. 1, since erasure of a storage medium is performed on a block basis, but in many embodiments, programming of the storage medium is performed on a smaller subunit of a block (e.g., on a page basis), pages with invalid data cannot be overwritten until the whole block containing those pages is erased. The storage system (e.g., data storage system 100, FIG. 1) uses garbage collection to reclaim portions of memory (e.g., storage medium 130, FIG. 1) that no longer contain valid data, which initiates performance of method 700.

At least in some implementations, method 700 is performed by a storage system (e.g., data storage system 100, FIG. 1) or one or more components of the storage system (e.g., memory controller 120 and/or storage medium 130, FIG. 1). In some embodiments, method 700 is governed by instructions that are stored in a non-transitory computer readable storage medium and that are executed by one or more processors of a device, such as the one or more processing units (CPUs) 122 of management module 121, shown in FIGS. 1 and 2.

A storage system (e.g., data storage system 100, FIG. 1), during a garbage collection operation, while writing data to a sequence of write units of a storage medium block (e.g., selectable portion of storage medium 131, FIG. 1), delays (702) enabling read access to a respective write unit of the storage medium block, to which data was written during garbage collection, until a predefined subsequent operation on the storage medium block has been completed. In some implementations, a delay module (e.g., delay module 232, FIG. 2) is used to delay enabling read access to the respective write unit of the storage medium block, as described above with respect to FIG. 2.

In some embodiments, the predefined subsequent operation on the storage medium block comprises (704) completion of writing data to at least N write units subsequent to writing data to the respective write unit. In some embodiments, the write units are word lines. For example, if a write unit is a word line and N is equal to 2, the predefined subsequent operation on the storage medium block comprises completion of writing data to at least 2 word lines subsequent to writing data to the respective word line. Again, if the write unit is a word line and N is equal to 2, using the word lines from FIG. 6 as an example, the storage system delays enabling read access to $WL_N$ 602, to which data was written during garbage collection, until completion of writing data to $WL_{N+1}$ 604 and $WL_{N+2}$ 606. Although word lines were used as an example here, in other embodiments, the write units are pages, or other units that can be programmed by a storage system. It is noted that the write units in method 700 need not be the minimum size write units of the physical storage devices to which data is being written. Thus, in some embodiments, the write units for method 700 are word lines, but the minimum size write unit of the physical storage devices is a page or other unit smaller than a complete word line.

In some embodiments, the predefined subsequent operation on the storage medium block comprises (706) completion of writing data to all remaining write units of the storage medium block subsequent to writing data to the respective write unit. Using FIG. 6 as an example, the storage system delays enabling read access to $WL_N$ 602, to which data was written during garbage collection, until completion of writing data to all remaining word lines of the storage medium block. In some embodiments, the storage system delays enabling read access to a first page of a storage medium block, to which data was written during garbage collection, until completion of writing data to all remaining pages of the storage medium block subsequent to writing data to the first page.

In some embodiments, the sequence of write units is (708) on a sequence of word lines. In some embodiments, write units are pages and the sequence of pages is on a sequence of word lines. For example, if a word line has two pages (e.g., a lower page and an upper page), data may be written to the sequence of pages in word line order (e.g., completing programming of the lower page and the upper page of a word line before starting programming of the next word line) or data may be written to the sequence of pages in a zigzag fashion, as described above with respect to FIG. 6.

In some embodiments, the storage medium comprises (710) one or more non-volatile storage devices, such as flash memory devices. In some implementations, the non-volatile storage medium (e.g., storage medium 130, FIG. 1) is a single flash memory device, while in other implementations the non-volatile storage medium includes a plurality of flash memory devices. In some implementations, the non-volatile storage medium (e.g., storage medium 130, FIG. 1) is NAND-type flash memory or NOR-type flash memory.

Optionally, in some embodiments, the storage system (e.g., data storage system 100, FIG. 1) updates (712) a translation table to point to the respective write unit after the predefined subsequent operation on the storage medium block has been completed. For example, if the predefined subsequent operation is writing data to at least 2 write units (e.g., 2 word lines) subsequent to writing data to the respective write unit (e.g., $WL_N$ 602, FIG. 6), the storage system updates a translation table to point to the respective write unit (e.g., $WL_N$ 602, FIG. 6) after completion of writing data to at least 2 write units (e.g., $WL_{N+1}$ 604 and $WL_{N+2}$ 606, FIG. 6) subsequent to writing data to the respective write unit. In some implementations, an update module (update module 234, FIG. 2) is used to update the translation table (e.g., translation table 222, FIG. 2), as described above with respect to FIG. 2.

FIG. 8 illustrates a flowchart representation of a method 800 of writing data in a storage system, in accordance with some embodiments. As noted above with respect to FIG. 1, since erasure of a storage medium is performed on a block basis, but in many embodiments, programming of the storage medium is performed on a smaller subunit of a block (e.g., on a page basis), pages with invalid data cannot be overwritten until the whole block containing those pages is erased. The storage system (e.g., data storage system 100, FIG. 1) uses garbage collection to reclaim portions of memory (e.g., storage medium 130, FIG. 1) that no longer contain valid data, which initiates performance of method 800. Alternatively, as noted above with respect to FIG. 1, during a write operation, the storage system (e.g., data storage system 100, FIG. 1) receives data to be stored in a storage medium (e.g., storage medium 130, FIG. 1) from a host (e.g., computer system 110, FIG. 1), which initiates performance of method 800.

At least in some implementations, method 800 is performed by a storage system (e.g., data storage system 100, FIG. 1) or one or more components of the storage system (e.g., memory controller 120 and/or storage medium 130, FIG. 1). In some embodiments, method 800 is governed by instructions that are stored in a non-transitory computer readable storage medium and that are executed by one or more processors of a device, such as the one or more processing units (CPUs) 122 of management module 121, shown in FIGS. 1 and 2.

A storage system (e.g., data storage system 100, FIG. 1), during a garbage collection operation, while writing data to a first sequence of write units of a storage medium block, performs (802) a coarse multi-bit write operation that partially programs each memory cell of a respective write unit with a plurality of bits, followed by a second (e.g., fine) multi-bit write operation that completes programming of each memory cell of the respective write unit with the plurality of bits. In some embodiments, using a 2-bit (i.e., q=2) memory cell for example, a coarse 2-bit write operation partially programs the lower page and upper page bits of the memory cell. In some embodiments, FIG. 4A illustrates voltage distributions found in a memory cell after the coarse 2-bit write operation. Subsequent to the coarse multi-bit write operation, a second (e.g., fine) multi-bit write operation completes programming of each memory cell of the respective write unit. In some embodiments, using a 2-bit (i.e., q=2) memory cell for example, a second (e.g., fine) 2-bit write operation completes programming of the lower page and upper page bits of the memory cell. In some embodiments, FIG. 4B illustrates voltage distributions found in a memory cell after the second (e.g., fine) 2-bit write operation. In some implementations, a garbage collection write module (e.g., garbage collection write module 228, FIG. 2) is used to write data to the first sequence of write units, as described above with respect to FIG. 2. Although a 2-bit (i.e., q=2) memory cell is used as an example here, the 2-bit implementation may be extended to other types of memory that have more bits (q≥3) per memory cell.

In some embodiments, during the garbage collection operation, the storage system performs (804) a second coarse multi-bit write operation that partially programs each memory cell of another write unit, distinct from the respective write unit, after the coarse programming of the respective write unit and prior to the second (e.g., fine) multi-bit write operation that completes programming of each memory cell of the respective write unit. For example, as discussed above with respect to FIG. 6, in some embodiments, the storage system performs a second coarse multi-bit write operation (e.g., Coarse (1), FIG. 6) that partially programs another write unit (e.g., $WL_{N+1}$ 604, FIG. 6), distinct from the respective write unit (e.g., $WL_N$ 602, FIG. 6), after the coarse programming of the respective write unit (e.g., Coarse (0), FIG. 6) and prior to the second (e.g., fine) multi-bit write operation that completes programming of the respective write unit (e.g., Fine (2), FIG. 6). In some implementations, a garbage collection write module (e.g., garbage collection write module 228, FIG. 2) is used to perform write operations, as described above with respect to FIG. 2.

In some embodiments, during the garbage collection operation, the storage system performs two or more write operations on write units distinct from the respective write unit after the coarse programming of a respective write unit and prior to the second (e.g., fine) multi-bit write operation that completes programming of each memory cell of the respective write unit. In the example shown in FIG. 6, the two or more write operations are a fine multi-bit write operation on a prior write unit relative to the respective write unit and a coarse write operation on a subsequent write unit relative to the respective write unit.

In some embodiments, the storage medium comprises (806) one or more non-volatile storage devices, such as flash memory devices, as described above with respect to operation 710 (FIG. 7).

Next, the storage system, during a write operation, performed in response to a host command, while writing data to a second sequence of write units of the storage medium block, performs (808) a lower page write operation that partially programs each memory cell of a respective write unit with a single, respective lower page bit, followed by an upper page write operation that completes programming of each memory cell of the respective write unit with a respective upper page bit. In some embodiments, using a 2-bit (i.e., q=2) memory cell for example, the storage system performs a lower page write operation that partially programs the memory cell with a single lower page bit. In some embodiments, FIG. 5A illustrates voltage distributions found in a memory cell after the lower page write operation. Subsequent to the lower page write operation, the storage system performs an upper page write operation that completes programming of the memory cell with an upper page bit. In some embodiments, FIG. 5B illustrates voltage distributions found in a memory cell after the upper page write operation. In some implementations, a data write module (e.g., data write module 218, FIG. 2) is used to write data to the second sequence of write units, as described above with respect to FIG. 2.

Optionally, when erasing data in the second sequence of write units, the storage system performs (810) a default erase operation. In some embodiments, data that was written to the second sequence of write units was written during a write operation, performed in response to a host command, and lower page/upper page programming was used. The storage system performs a default erase operation when erasing this data. In some implementations, a data erase module (e.g., data erase module 220, FIG. 2) is used to erase data in the second sequence of write units, as described above with respect to FIG. 2.

Optionally, when erasing data in the first sequence of write units, the storage system performs (812) a shallow erase operation having a shorter duration than the default erase operation. In some embodiments, data that was written to the first sequence of write units was written during a garbage collection operation, and coarse/fine programming was used. As a result of using coarse/fine programming, the voltage distributions are tighter (e.g., compared to voltage distributions from lower page/upper page programming) and a shallow erase operation may be used. In some embodiments, a shallow erase operation has a shorter duration than the default erase operation. In some embodiments, a shallow erase operation reduces stress on (e.g., causes less damage to) the tunnel oxide of the floating gate transistor than the default erase operation, which translates to higher reliability of the memory cells. In some implementations, a garbage collection erase module (e.g., garbage collection erase module 230, FIG. 2) is used to erase data in the first sequence of write units, as described above with respect to FIG. 2.

In some implementations, with respect to any of the methods described above, the storage medium (e.g., storage medium 130, FIG. 1) is a single flash memory device, while in other implementations, the storage medium (e.g., storage medium 130, FIG. 1) includes a plurality of flash memory devices.

In some implementations, with respect to any of the methods described above, a storage system includes a storage medium (e.g., storage medium 130, FIG. 1), one or more processors (e.g., CPUs 122, FIGS. 1 and 2) and memory (e.g., memory 206, FIG. 2) storing one or more programs configured for execution by the one or more processors and configured to perform or control performance of any of the methods described above.

In some implementations, with respect to any of the methods described above, a device operable to perform garbage collection and/or operable to write data includes a storage medium interface (e.g., storage medium I/O 128, FIG. 1) for coupling the device to the storage medium (e.g., storage medium 130, FIG. 1) and one or more modules, including a memory management module (e.g., management module 121, FIGS. 1 and 2) that includes one or more processors (e.g., CPUs 122, FIGS. 1 and 2) and memory (e.g., memory 206, FIG. 2) storing one or more programs configured for execution by the one or more processors, the one or more modules coupled to the storage medium interface (e.g., storage medium I/O 128, FIG. 1) and configured to perform or control performance of any of the methods described above.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of garbage collection in a storage system, the method comprising:
   performing a garbage collection operation, including:
      writing data, for the garbage collection operation, to a sequence of write units of a non-volatile storage medium block that was erased prior to writing data to the sequence of write units, including:
         writing data to a first write unit of the storage medium block; and
         after writing data to the first write unit, writing data to at least N write units of the storage medium block, the at least N write units of the storage medium block including a second write unit of the storage medium block, wherein N is a positive integer;

after writing data to the at least N write units,
enabling read access to the first write unit;
writing data to a subsequent write unit of the storage medium block; and
after writing data to the subsequent write unit, enabling read access to the second write unit.

2. The method of claim 1, further comprising deferring updating a translation table to point to the first write unit until after writing data to the at least N write units has been completed.

3. The method of claim 1, wherein the sequence of write units is on a sequence of word lines.

4. The method of claim 1, wherein the storage medium comprises one or more flash memory devices.

5. A device operable to perform garbage collection for a storage medium, the device comprising:
a storage medium interface for coupling the device to the storage medium; and
one or more modules, including a memory management module that includes one or more processors and memory storing one or more programs configured for execution by the one or more processors, the one or more modules coupled to the storage medium interface and configured to:
perform a garbage collection operation, including:
writing data, for the garbage collection operation, to a sequence of write units of a non-volatile storage medium block that was erased prior to writing data to the sequence of write units, including:
writing data to a first write unit of the storage medium block; and
after writing data to the first write unit, writing data to at least N write units of the storage medium block, the at least N write units of the storage medium block including a second write unit of the storage medium block, wherein N is a positive integer;
after writing data to the at least N write units,
enabling read access to the first write unit;
writing data to a subsequent write unit of the storage medium block; and
after writing data to the subsequent write unit, enabling read access to the second write unit.

6. The device of claim 5, wherein the one or more modules are further configured to defer updating a translation table to point to the first write unit until after writing data to the at least N write units has been completed.

7. The device of claim 5, wherein the sequence of write units is on a sequence of word lines.

8. The device of claim 5, wherein the storage medium comprises one or more flash memory devices.

9. A non-transitory computer readable storage medium storing one or more programs configured for execution by a device coupled to a storage medium, the one or more programs comprising instructions for causing the device to:
perform a garbage collection operation, including:
writing data, for the garbage collection operation, to a sequence of write units of a non-volatile storage medium block that was erased prior to writing data to the sequence of write units, including:
writing data to a first write unit of the storage medium block; and
after writing data to the first write unit, writing data to at least N write units of the storage medium block, the at least N write units of the storage medium block including a second write unit of the storage medium block, wherein N is a positive integer;
after writing data to the at least N write units,
enabling read access to the first write unit;
writing data to a subsequent write unit of the storage medium block; and
after writing data to the subsequent write unit, enabling read access to the second write unit.

10. The non-transitory computer readable storage medium of claim 9, wherein the one or more programs further include instructions that, when executed by the one or more processors, cause the device to defer updating a translation table to point to the first write unit until after the writing data to the at least N write units has been completed.

11. The non-transitory computer readable storage medium of claim 9, wherein the sequence of write units is on a sequence of word lines.

12. The non-transitory computer readable storage medium of claim 9, wherein the storage medium comprises one or more flash memory devices.

13. The method of claim 1, wherein N is at least two.

14. The device of claim 5, wherein N is at least two.

15. The non-transitory computer readable storage medium of claim 9, wherein N is at least two.

* * * * *